G. DALÉN.
AUTOMATIC VALVE.
APPLICATION FILED MAY 3, 1910.
1,041,748.
Patented Oct. 22, 1912.
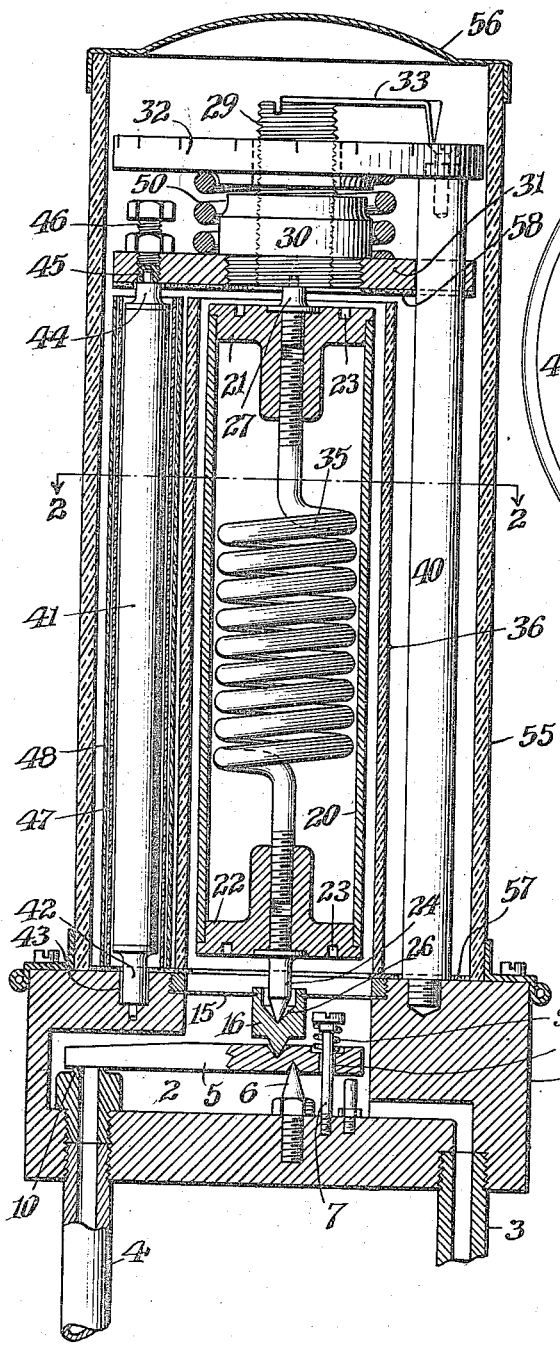
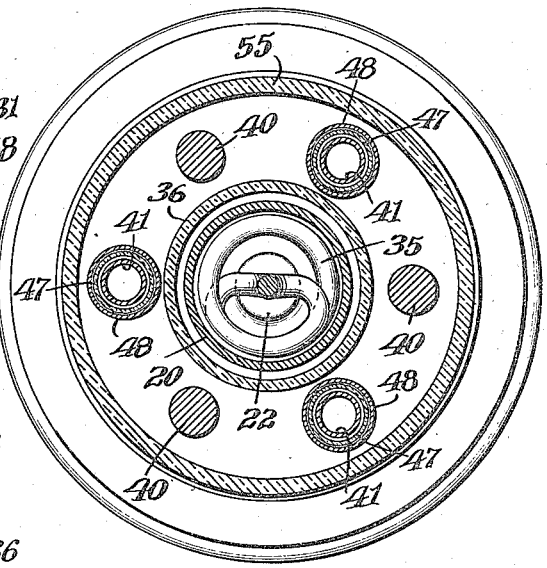
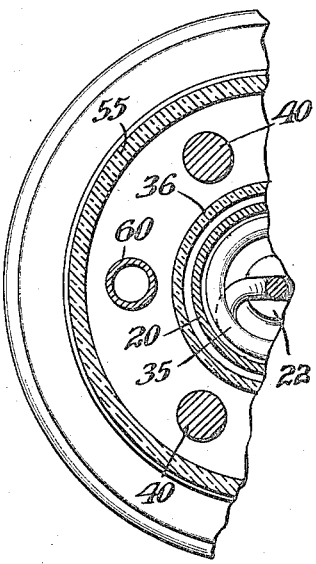
WITNESSES
Daniel Webster, Jr.
Carrie E. Kleinfelder.
INVENTOR
Gustaf Dalén
BY Cyrus N. Anderson
ATTORNEY

UNITED STATES PATENT OFFICE.

GUSTAF DALÉN, OF STOCKHOLM, SWEDEN, ASSIGNOR TO AMERICAN GASACCUMULATOR COMPANY, OF PHILADELPHIA, PENNSYLVANIA, A CORPORATION OF NEW JERSEY.

AUTOMATIC VALVE.

1,041,748.  Specification of Letters Patent.  Patented Oct. 22, 1912.

Application filed May 3, 1910. Serial No. 559,215.

*To all whom it may concern:*

Be it known that I, GUSTAF DALÉN, a subject of the King of Sweden, residing in Stockholm, Sweden, have invented certain new and useful Improvements in Automatic Valves, of which the following is a specification.

Broadly considered my invention relates to improvements in apparatus generally in which one or more bodies are provided which when exposed to light expand and thereby actuate a certain previously selected member; and one object of my invention is to provide means whereby the adjustment of the co-efficient of expansion of such body or bodies may be effected.

My invention is illustrated in the accompanying drawings as applied to or combined with the mechanism for actuating a valve in an apparatus of the same general character as that which is illustrated in Figure 1 of Letters Patent of the United States granted to me November 16, 1909, No. 939,986.

Apparatus provided with means for automatically opening and closing a valve, which means depends for its operation upon the unequal expansion of two bodies due to the influence of light on such bodies which bodies contract in darkness, has heretofore been constructed,—the unequally expanding bodies being so connected to the valve that the latter is actuated by their unequal expansion and consequent extension. In practice these unequally expanding bodies have consisted of metal cylinders or pipes one of which has been provided with a light reflecting surface while the surface of the other of the said cylinders or pipes has been light absorbing. It is known that in order to secure a proper function and operation of the apparatus under varying conditions of temperature, the metal or metals of which the said cylinders or pipes are made should possess exactly the same co-efficient of expansion. It is well known, however, that this is not always the case even when the expanding bodies, whether cylinders or pipes, are made of the same metal. Such difference in expansion may be due to various causes, as for instance differences in the processes of manufacture of such bodies. It has been ascertained and established by experiments that the co-efficient of expansion of solid bodies, whether cylinders or pipes, varies with the pressure to which they may be subjected, that is, the load imposed upon them.

One of the objects of the present invention is to utilize this characteristic and scientific fact in the construction of apparatus in which the unequal expansion of two bodies under the influence of light and the absence of light is employed for effecting the automatic opening and closing of a valve.

Other objects and advantages of my invention will be referred to hereinafter or will be obvious from what is set forth.

The principle of my invention is illustrated in the accompanying drawings but it will be understood that the same may be embodied in other forms of construction and that I have not undertaken herein to illustrate all of the forms which it may take.

In the drawings:—Fig. 1 is a longitudinal sectional view of an apparatus embodying my invention; Fig. 2 is a transverse section on the line 2—2 of Fig. 1; and Fig. 3 is a transverse section of a portion of the apparatus showing a modified construction.

In the drawings:—1 designates a base member having a chamber 2 formed therein. 3 is a gas inlet pipe communicating with the said chamber and 4 is a gas outlet pipe from the said chamber.

5 designates a valve pivotally supported on knife edges or points 6 secured in the bottom of the chamber 2 to the base 1.

7 designates a post secured in the bottom of the chamber 2 at one side of the points or knife edges 6 and which extends upwardly through a hole 8 in one end portion of the valve 5. A coiled spring 9 surrounding the said post 7 and located above the said valve exerts pressure upon the said valve to cause pivotal movement on the points 6 and remove it from the valve seat 10 when the pressure is removed from the said valve upon the opposite side of the knife edges or points 6.

15 designates a diaphragm which closes the chamber 2 which diaphragm is provided with a plug 16 having a sharp point which engages the valve 5 as shown in Fig. 1 of the drawings.

20 designates a hollow metal cylinder having its opposite ends closed by plugs 21 and 22 which plugs are each provided with small holes 23 by means of which they may be turned. The lower plug 22 is provided with a pointed member 24 which rests in a seat 26 formed in the plug 16 secured to the diaphragm 15. The upper plug 21 is provided with a bearing member 27 which engages a seat in the lower end of a screw 29, the latter having screw-threaded engagement with a plug 30 secured in a plate 31. By adjustment of the screw 29 the position of the cylinder 20 with the parts connected thereto is varied so as to vary the distance between the upper end of the said metal cylinder or the member 27 secured to such upper end and the valve seat 10 and the upper edges or ends of the knife edges or points 6.

It will be understood that the construction of the means for adjusting or varying the position of the metal cylinder 20 may be varied as desired.

For the purpose of indicating the amount of adjustment or variation of the cylinder 20 I have provided the screw 29 with a pointer 33 which is associated with a graduated disk 32. The screw 29 extends through an opening in the disk 32 but is not connected to the said disk. The relation of the graduations on the disk 32 to the pitch of the screw 29 is such that the amount of adjustment of the latter may be read or ascertained from the said graduations.

For the purpose of imposing a certain compressive load or pressure upon the metal cylinder 20, I have provided the coiled spring 35 the opposite ends of which have screw-threaded engagement with the plugs 21 and 22 in the opposite ends of the said cylinder. If it is desired to increase or diminish the compressive force of the said spring upon the said cylinder, the plugs 21 and 22 or either of them may be turned in one direction or the other. If either of the said plugs or both of them are turned in a direction to extend or expand the said coiled spring, the compressive force exerted thereby is increased. If turned in the opposite direction, the compressive force is diminished. In this way the co-efficient of expansion of the said metal cylinder 20 is varied.

It is to be understood that any other suitable means which may be found desirable and practicable may be employed for increasing or diminishing the load or pressure exerted upon the said cylinder.

The surface of the cylinder 20 is coated with any suitable substance, such as lamp black, for the purpose of making it light absorbing. The said cylinder is surrounded and protected by a glass cylinder 36 which extends between the base 1 and the plate 31, ending a short distance below the latter. It should be noted that the plate 31 is guided upon upright posts 40 the lower ends of which are secured to the base 1 and the upper ends of which are connected to the disk or plate 32.

At different points outside of the glass cylinder 36, pipes or tubes 41 are provided which should be of the same kind of metal as the cylinder 20. There are three of these pipes or tubes each of which is provided with a socket piece 42 seated in openings 43 in the base 1. The upper ends of each of the said pipes or tubes are provided with reduced end portions 44 which extend into sockets 45 formed in the lower ends of adjustable screws 46 which are in engagement with the plate 31.

47 designates glass tubes which surround the metal pipes or tubes 41, and 48 designates tubes which surround the glass tubes. The tubes 48 should be light reflecting and their surfaces may be made light reflecting in any manner desired and which may be practicable. The purpose of the glass tubes is to prevent as far as practicable the transmission of any heat to the inner pipes or tubes 41. It will be noted that the tubes 47 and 48 are slightly shorter than the distance between the plate 31 and the base member 1; also that the glass tubes fit loosely around the pipes or tubes 41; and that the tubes 48 fit loosely around the glass tubes 47.

The coiled spring 50 which surrounds the plug 30 exerts pressure upon the plate 31 which pressure may be varied by adjusting the screws 46 such variation of pressure being communicated through the adjusting screw 46 to the pipes or tubes 41.

Although I have shown means for adjusting the load or compressive force upon the metal cylinders 20 and 41, it will be understood that it is only necessary that one of the said parts 20 or 41 shall be provided with means for varying the load to which it may be subjected to thereby vary the co-efficient of expansion so that the co-efficient of expansion of the two parts 20 and 41 may be the same.

55 is a glass cylinder closed by means of a cover 56. The said cylinder rests upon the base 1, is secured thereto, and incloses and protects the several parts of the apparatus previously described.

For the purpose of preventing transmission of heat from the base 1 and the plates 31 to the chambers around the cylinders 20 and 41, I have provided the heat insulating sheets 57 and 58.

In Fig. 3 I have shown a construction differing from that illustrated in Figs. 1 and 2, in that the pipes or tubes 60, corresponding to the pipes or tubes 41, are not surrounded by other tubes or pipes but the surfaces of the pipes or tubes 60 are light reflecting.

It will be understood that the pipes or tubes 41 and 60 may, if desired, be made solid. It is not essential to the operation of my apparatus that these parts be made hollow as shown.

It will be understood that the apparatus illustrated and described by me is intended for use in connection with signal light apparatus in which it is desired that flashes of light, the periods of which may vary, shall be followed by intervals of darkness. During the periods of darkness the light absorbing member 20 dissipates its heat, shortens and permits the opening of the valve 5. Gas passes into the outlet pipe 4, is conducted to a burner (not shown) where it is ignited in any suitable manner, as by a pilot flame. The influence of the artificial light from the burner flame upon the light absorbing member 20 causes it to expand and close the valve 5 thus interrupting the flow of gas causing a period of darkness. It is obvious that this operation will be repeated during the time that the darkness lasts.

Having thus described my invention, I claim:—

1. In combination, a working or operable member, a member which expands under the influence of light and contracts in the absence or partial absence of light, the said expanding and contracting member being in operative relation to said working or operable member whereby the expansion and contraction thereof causes the actuation of said working or operable member, and means for causing a variation of the co-efficient of expansion of said expanding and contracting member.

2. In combination, a working or operable member, a member which expands under the influence of light and contracts in the absence or partial absence of light, the said expanding and contracting member being in operative relation to said working or operable member whereby the expansion and contraction thereof causes the actuation of said working or operable member, and means for imposing a variable load or pressure upon the said expanding and contracting member whereby the co-efficient of expansion of the said member is varied.

3. In combination, a working or operable member, a member which expands under the influence of light and contracts in the absence or partial absence of light, the said expanding and contracting member being in operative relation to said working or operable member whereby the expansion and contraction thereof causes the actuation of said working or operable member, a spring for exerting a load or pressure upon the said expanding and contracting member, and means for varying the tension of the said spring whereby the co-efficient of expansion of the said expanding and contracting member is varied.

4. In combination, a working or operable member, a hollow metallic cylinder in operative relation to the working or operable member whereby the expansion and contraction of the cylinder under the influence of light and darkness causes the actuation of the said working or operable member, devices at the opposite ends of the said cylinder, a coiled spring situated in the said cylinder and having its opposite ends secured to the said devices, and means for varying the tension of the said spring whereby the co-efficient of expansion of the said hollow cylinder is varied.

5. In combination, a working or operable member, a plurality of bodies adapted to be unequally expanded under the influence of light, means interposed between said bodies and the working or operable member whereby the actuation of the said working or operable member is caused by the unequal expansion of the said bodies, and means for controlling the co-efficient of expansion of the said bodies whereby such co-efficient in each of the said bodies may be made the same.

6. In combination, a working or operable member, a plurality of bodies adapted to be unequally expanded under the influence of light, one of the said bodies being light absorbing and the other of the said bodies being protected from the light by a light reflecting surface, springs for exerting pressure upon the said bodies, means for adjusting the tension of the said springs whereby the co-efficient of expansion of the said bodies may be controlled and equalized, and means interposed between said bodies and said working or operable member whereby the latter is actuated by the expansion and contraction of said bodies.

7. In an apparatus of the character described, the combination of a working or operable member, a light absorbing member having operative connection with the said member, members protected from the influence of light by light reflecting surfaces, a plate supported upon the said last mentioned members, the said light absorbing member having operative connection with the said plate, and means for exerting loads or pressures upon the said several members whereby the co-efficient of expansion of the said members may be varied and controlled.

8. In an apparatus of the character described, the combination of a valve for closing a gas conduit, the said valve being located in a suitable chamber, a diaphragm for closing the said chamber, the said diaphragm being provided with a pointed member in engagement with the said valve, a light absorbing member supported upon the member upon the said diaphragm, members surrounded by light reflecting surfaces, a plate supported upon the said members, one end of the said light absorbing member being held in position by the said plate, and adjustable springs for exerting pressure upon the said several members whereby their co-efficients of expansion may be varied and controlled.

9. In an apparatus of the character described, in combination a valve, a light absorbing body and a body having means for protecting it against the action of light whereby the said bodies expand unequally, the said protecting means consisting of a tube having a light reflecting surface, an inner tube of non-heat-conducting material, both of which tubes surround the said body, and means for connecting the unequally expanding bodies to the said valve whereby the latter is operated.

10. In combination a working or operable member, a light absorbing body and a body having means for protecting it against the action of light whereby the said bodies expand unequally under the influence of light, the said protecting means consisting of a tube having a light reflecting surface and which surrounds said body, and means for operatively connecting said unequally expanding bodies to said working or operable member whereby it may be actuated.

11. In a device of the character described, the combination of a valve, a member which expands under the influence of light and contracts in the absence or partial absence of light, means interposed between the said valve and the said member whereby the expansion and contraction of the latter causes actuation of the said valve, and means for causing a variation of the co-efficient of expansion of the said expanding and contracting member.

12. In an apparatus of the character described, the combination of a valve member, a light absorbing body and a light reflecting body having operative connection with each other, means for operatively connecting the said bodies to the said valve member whereby the latter is operated, and means for varying and controlling the co-efficient of expansion of one of the said bodies whereby such co-efficient of expansion in the said two bodies may be equalized.

In testimony that I claim the foregoing as my invention, I have hereunto signed my name this 14th day of April, A. D. 1910.

GUSTAF DALÉN.

In the presence of—
WALDEMAR BOMAN,
T. EKEBOHM.